2,646,529

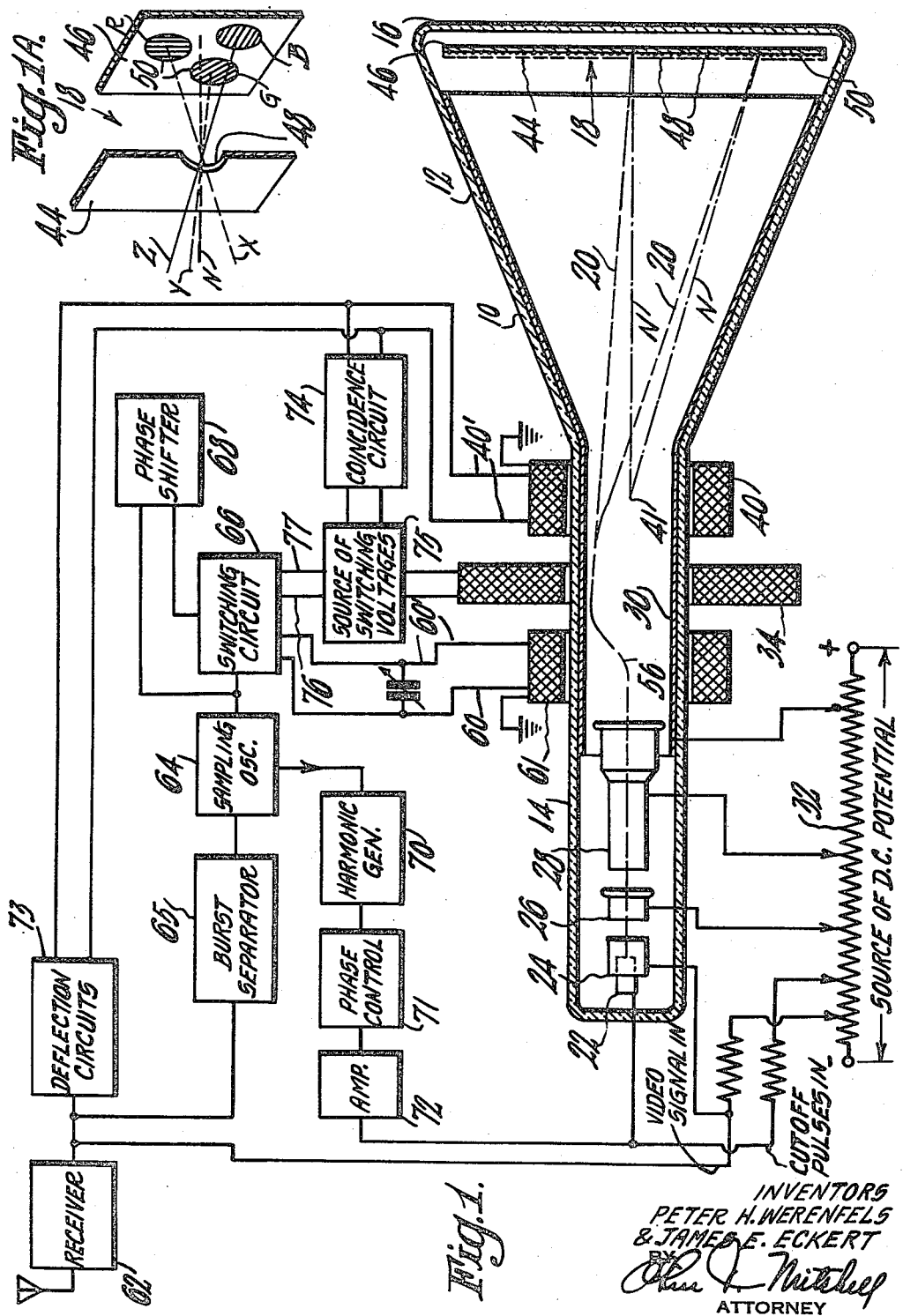

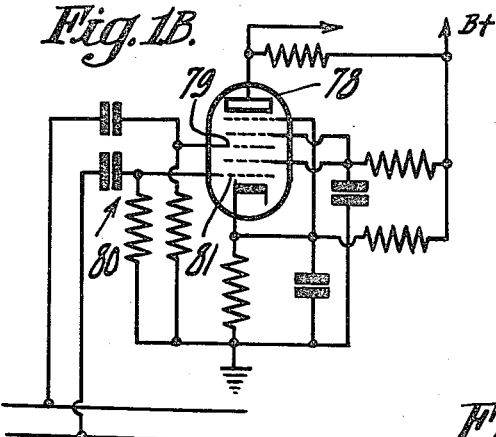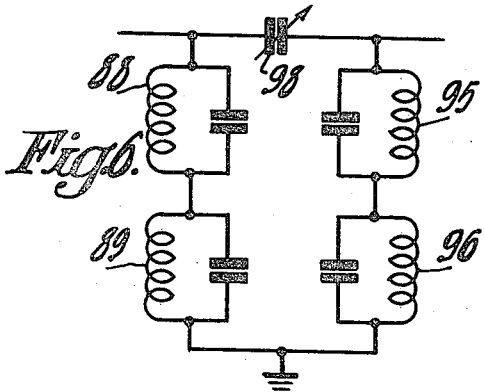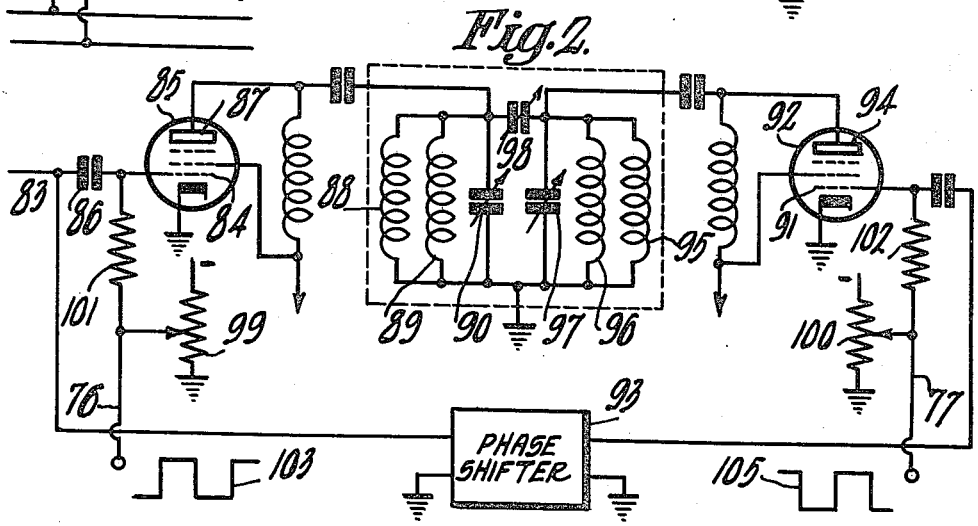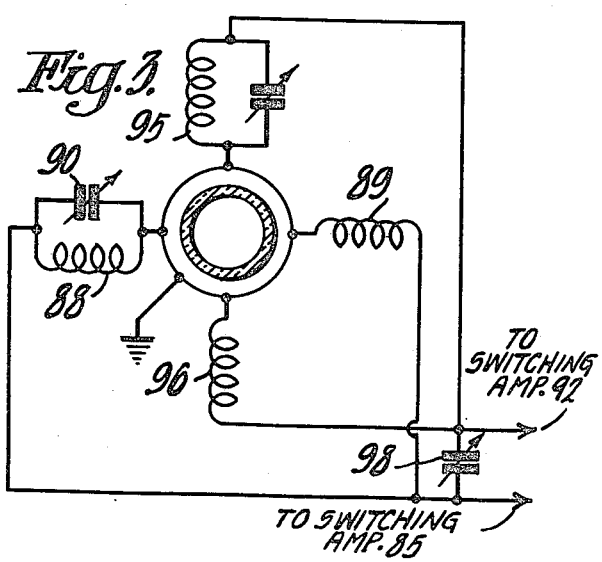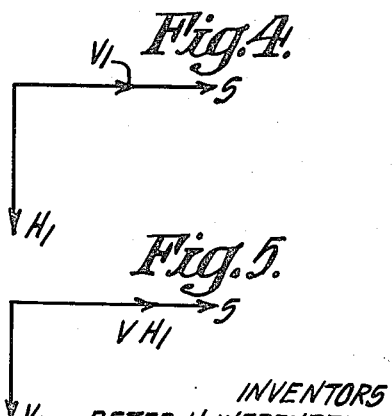
INVENTORS
PETER H. WERENFELS
& JAMES E. ECKERT
ATTORNEY Patented July 21, 1953

UNITED STATES PATENT OFFICE 2,646,529

APPARATUS FOR REPRODUCING IMAGES IN COLOR

Peter H. Werenfels, Lawrenceville, and James E. Eckert, Princeton, N. J., assignors to Radio Corporation of America, a corporation of Delaware Application October 11, 1951, Serial No. 250,870

3 Claims. (Cl. 315—24)

This invention relates to improvements in apparatus for providing a reversible rotating magnetic field. This improved apparatus is to be employed in conjunction with a cathode ray tube employing a single beam of electrons for sequentially reproducing primary colors at an intensity determined by signals applied to it.

A kinescope for reproducing images in color in response to electrical signals has been devised in which the beam of electrons rotates about the path to the target that it would follow in the normal kinescope. The rotation is produced by a radial rotating magnetic field. However, the beam is focussed so that it strikes the same spot as a normal beam. Hence the beam can be thought of as generating a surface of revolution of nearly conical shape having its apex scanning the target. The rotation of the beam thus causes the electrons of the beam to approach the target from constantly varying directions in addition to the change in direction resulting from the scanning action. The target is constructed so that the primary color emitted in response to the beam of electrons depends on the direction of approach of the beam with respect to the path that would be followed in a normal kinescope, wherein the beam is not rotated, and the changes in direction due to the beam scansion do not produce any changes in color. The colors are therefore reproduced in a given sequence as the beam rotates.

As pointed out in the U. S. patent application bearing Serial No. 220,622, and filed on April 12, 1951, in the name of Sziklai, Schroeder and Bedford, improved results can be obtained if the transmitted signal represents the primary colors in one sequence during one interval of time and a reverse sequence during another interval of time.

It has previously been suggested that the rotating magnetic field could be established in the following manner. Two pairs of diametrically opposed coils are mounted about the neck of the cathode ray tube in such fashion that their magnetic fields lie along a radius of the neck. The pairs of coils are so disposed that their radial magnetic fields make an angle of 90° with one another. Each pair of coils is energized with differently phased currents of beam rotational frequency. If the coils are not coupled together, reversal of beam rotation has been obtained by interchanging the phases of the energizing currents applied to the different coils. It has also been suggested that a rotating magnetic field can be set up if the coils are coupled together and only one pair is energized directly. Whether this coupling is capacitative or inductive depends on the direction of rotation to be employed. The direction of rotation can also be reversed by directly energizing the other pair of coils. Merely switching the direct energization from one pair of coils to the other, although effecting the desired beam rotation produces 90° phase shift in the resultant magnetic field. Consequently, the beam's direction of approach to the screen changes and there is an undesirable change in the color reproduced at the screen of the cathode ray tube.

Accordingly, it is an object of the present invention to provide means for reversing the rotation of a radial magnetic field established by coupled coils in such manner that the instantaneous phase of the resultant field is not changed at the instant when its direction of rotation is reversed.

Briefly, this objective may be achieved by energizing one pair of coils directly to produce a magnetic field rotating in one direction, and energizing the other pair of coils by means of a phase shifter to produce an oppositely rotating magnetic field.

The manner in which this objective may be reached will be better understood from the detailed description of the drawings in which:

Figures 1 and 1A illustrate the details of a color kinescope with which the present invention may be employed.

Figure 1B illustrates the details of a coincidence circuit that may be employed.

Figure 2 illustrates a circuit embodying the invention to effect the reversal of rotation of the beam in the kinescope in Figures 1, 1A and 1B without change in the phase of the resultant field.

Figure 3 illustrates the physical arrangement of the coils of the yoke shown in Figure 2.

Figures 4 and 5 are vector diagrams useful in explaining the operation of the beam rotation yoke of Figure 2, and Figure 6 is a schematic diagram of another arrangement of the coils of the beam rotation yoke shown in Figure 2.

Referring to the drawings, Figure 1 shows a cathode ray tube to be used in conjunction with the circuit of this invention. The tube consists of an evacuated envelope 10, having both a conical portion 12 and a tubular neck portion 14 coaxially joined together as shown. The conical portion 12 of the envelope is closed by a face plate 16 and closely spaced from it is a fluorescent target and screen structure 18 to be described below. Mounted coaxially within the tubular envelope portion 14 is an electron gun structure for producing and focusing a beam of electrons 20 on the screen structure 18. The electron gun is of conventional design and consists of a cathode cylinder 22 closed, as is shown, at the end facing the target screen 18. The closed end of the cathode cylinder is coated, as is well known in the art, by a mixture of strontium and barium oxides which, when heated to an appropriate temperature, produce a free emission of electrons.

A control grid cylinder 24 coaxially surrounds the electron emitting end of the cathode 22 and has an apertured plate structure closing one end thereof and closely spaced from the coated surface of the cathode. A shield electrode or grid 26 constitutes a short thimble-like electrode having an aperture in the bottom thereof for the passage of electrons therethrough. Spaced along the tubular neck portion 14 and coaxial with the other electron gun parts is a tubular first anode electrode 28, having an enlarged portion at the end facing the fluorescent screen 18. A second anode electrode is formed by a conductive coating 30 on the inner surface of the tubular envelope portion 14 and extends into the conical envelope portion 12 to a point adjacent the fluorescent screen 18. The several electrodes described, which constitute the electron gun structure of the tube, are, during tube operation connected to a source of direct current potential that may be a voltage divider 32 connected between the positive and negative points of a direct current potential source.

The electrostatic fields produced respectively between electrodes 26 and 28, and 28 and 30, are of a converging nature and cause the electrons to form into a beam having a minimum cross section or cross-over point 56 between tubular electrode 28 and screen 18. The electron beam, after passing through this cross-over point 56, tends to diverge before striking the screen 18. The diverged beam is bent away from the central axis of the tube by a rotating radial magnetic field. As is well known in the art, such a field can be generated by applying current of one phase to a first pair of coils 60 that are diametrically mounted about the neck of the tube and applying current of a different phase to a second pair of coils 60' that are mounted with their axis at 90° to the first pair. For simplicity the coils 60 and 60' are shown as one yoke 61. A focusing coil 34 serves to converge the electrons within the beam and also to direct the beam to the same point on a mask 44 that the beam would have struck if the coils 60 and 60' were not used. Thus the beam substantially generates a cone of revolution having an apex at the mask 44.

The electron beam 20 and hence the apex of the cone of revolution may be caused to scan over the surface of the mask 44 in any desired pattern or raster. However, in tubes of this type, the conventional scanning consists of parallel lines from top to the bottom of the screen 18. The scanning of the beam is produced by scanning fields established by two pairs of scanning coils included in the yoke 40. Each pair of coils is connected to well known circuits 73 producing saw-tooth voltages for providing both line and frame scansion of the beam.

In the screen structure 18, the masking electrode 44 is positioned in front of a transparent phosphor supporting sheet 46. The masking electrode 44 is formed from thin metallic foil which is opaque to the electrons of the beam 20. A plurality of apertures 48 are formed through the metal foil of the masking electrode 44. Supported on the surface of the transparent plate 46 are areas 50 of phosphor coating which are positioned in the path of the beam 20 passing through apertures 48.

In the enlarged section of the screen 18 shown in Figure 1A it can be seen that if the electron beam approaches the target from any one of the directions indicated as X, Y, or Z, the electrons of the beam will pass through the apertures of the masking electrode 44 and strike those phosphor spots which are in line with the beam path coincident with these directions. When the beam approaches the target along a path "X" it strikes only those phosphor coated spots indicated by "R," which luminesce with a red light. In a similar manner, when the beam approaches the target along path "Y," it strikes only those areas indicated by the letters "G" which luminesce with a green light. If the tube is a three color tube, the electrons of the beam approaching the target along the path "Z" will strike those phosphor areas indicated by the letter "B," which luminesce with a blue light.

Thus, the combined effects of the rotating field of coils 60 and 60' and that of the focusing coil 34 results in the beam 20 being first displaced from its normal path and then redirected along a new path to strike the surface of target 18 at an angle of from sequentially different directions and accordingly strikes the phosphor spots 50 in sequence.

The signals that sequentially represent the color in the scanned scene are detected by any suitable receiver 62 and are applied to the control grid 24 so as to vary the intensity of the beam 20. Alternating current of beam rotational frequency is applied directly from an oscillator 64 to a switching circuit 66. The output of the oscillator 64 is also supplied to the switching circuit 66 indirectly via a 90° phase shifter 68. Details of suggested switching circuits that form a part of this invention will be discussed in connection with Figures 2 and 3. One end of each of the coils 60 and 60' is grounded. The switching circuit 66 acts to selectively connect the ungrounded ends of the coils 60 and 60' to the oscillator 64 and the phase shifter 68 respectively.

If the coils 60 and 60' are properly coupled, the reversal of the direction of rotation of the resultant radial magnetic field established by the coils 60 and 60' as well as the direction of rotation of the beam 20 may be brought about by energizing one or the other.

In order that the beam 20 be turned off as it is traveling from one color spot to the next, the third harmonic of the output of the sampling oscillator 64 is developed by a harmonic generator 70 and applied to the cathode 24 in suitable phase and amplitude via a phase control 71 and an amplifier 72. The positive peaks of this harmonic keying wave overcome the beam cut off bias between the grid 24 and the cathode 22 so as to key the beam on only when it strikes any single one of the phosphor spots 50.

When the signals applied to the grid 24 from the output of the receiver 62 represent a given primary color the beam 20 should strike the phosphor spot that emits that color. In the system wherein the present invention is applicable, a burst of energy of color sequence or beam rotational frequency is inserted on the back porch of the television signal at the transmitter. This energy of beam rotational frequency has a fixed phase relationship to the sequential change in color information of the transmitted wave. A separator 65 separates the burst in a manner described in RCA Bulletins on Color Television and UHF, October 1949 to July 1950, and the burst is employed to control the phase of the alternating current supplied by the sampling oscillator 64 in any well known manner. The phase of the burst may not be the same as the signals representing a primary color, and any difference can be accommodated by the phase control 71 so that the red spot of phosphor is struck by the beam when the transmitted signal represents red. Further details of the color synchronizing system are not included as they are not believed necessary to the understanding of the present invention.

The following description relates to a way of changing the polarity of the switching circuit 66 and hence the direction of beam rotation between successive fields. Horizontal and vertical deflection waves are derived from the output of the receiver 67 by standard deflection circuits 73 and applied to the horizontal and vertical deflection coils in yoke 40 respectively. During beam retrace, rapidly collapsing magnetic fields in the deflection coils produce voltage pulses of high amplitude and in the opposite direction to the deflection waves supplied by the deflection circuits 73. If standard odd line interlace is employed, these horizontal and vertical "flyback" pulses occur simultaneously during the vertical blanking intervals of every other field. The "flyback" pulses are applied to a coincidence circuit 74 that produces a control pulse only when the pulses coincide. The control pulse is applied to the source of switching voltages 75. This latter source may be a free running multivibrator having two outputs that are 180° out of phase. One phase is applied to the switching circuit 66 via lead 76 and the other is applied to the switching circuit 66 via lead 77. When a pulse appears at the output of the coincidence circuit 74 the multivibrator 75 is triggered and the polarity of the signals appearing on leads 76 and 77 reverses.

One type of coincidence circuit that may be used is illustrated in Figure 1B. A multigrid tube 78 is biased to cut off by placing a positive potential on its cathode as shown. The horizontal "flyback" pulses are applied to a grid 79 by ordinary RC coupling. The vertical "flyback" pulses are differentiated by an RC coupling network 80 before being applied to a grid 81. When the two "flyback" pulses occur simultaneously the cut off bias on the cathode of the tube 78 is overcome on both grids and a pulse appears at its plate. It is this pulse that triggers the bistable source 75. The oppositely phased outputs of the source 75 are applied to the switching circuit 66 via leads 76 or 77 as noted above.

The switching circuit that is the subject of the present invention is illustrated in detail in Figure 2. The sampling frequency supplied by the oscillator 64 is applied to an input terminal 83 and is coupled to the grid 84 of a switching amplifier 85 via a condenser 86. The plate 87 of the amplifier 85 is coupled to the ungrounded terminals of a pair of beam rotation coils 88 and 89. A variable condenser 90 is connected in parallel with the beam rotation coils 88 and 89 and is adjusted so that the parallel combination thus formed is resonant at the sampling frequency.

The input terminal 83 is also coupled to the grid 91 of another normally cut-off switching amplifier 92 via a phase shifter 93. The plate 94 of the amplifier 92 is coupled to the un-grounded ends of another pair of beam rotation coils 95 and 96. A variable condenser 97 is connected in parallel with the coils 95 and 96 and is adjusted to tune them to parallel resonance at the sampling frequency.

The ungrounded ends of the beam rotation coils 88 and 89 are critically coupled by means of a variable condenser 98 to the ungrounded ends of the beam rotation coils 95 and 96. The beam deflection coils 88, 87, 95, 96, the condensers 90 and 97 and the coupling condenser 98 form the beam rotation yoke 61.

The switching amplifiers 85 and 92 are biased to cut off by the potentiometers 99 and 100 that are connected to the ends of the grid leak resistors 101 and 102 that are connected to the grids 84 and 91 respectively. The lower ends of the resistors 101 and 102 are also connected to the leads 76 and 77 from the source of switching voltages 75. Graphs 103 and 105 illustrate the relationship between the switching voltages that may appear on the leads 76 and 77. If the switching voltage or the lead 76 is at its most positive point the amplifier 85 is rendered conductive. At the same time the switching voltage on the lead 77 is at its most negative value and the switching amplifier 92 remains cut off. When the values of the switching voltages is interchanged, for example during the next field, the amplifier 85 is cut off and the amplifier 92 is rendered conductive.

As shown in Figure 3, the coils 88 and 89 are mounted on opposite sides of the neck 14 so as to produce a horizontal magnetic field; the coils 95 and 96 are mounted on opposite sides of the neck 14 so as to establish a vertical magnetic field. If the magnetic fields are precisely 90° out of phase and if stray magnetic fields are neglected, there is no magnetic coupling between the coils of the different pairs. Hence the only coupling available is by way of the condenser 98.

That the phase shifter 93 should change the phase of the sampling voltage "S" that is applied to it by substantially 90° can be seen by the aid of the vector diagrams of Figures 4 and 5. If the amplifier 85 is conducting, the current $H_1$ in the coils 88 and 89 that produce the horizontal magnetic field lags the sampling voltage "S" by 90°. Due to the capacitative coupling provided by the condenser 98, the current $V_1$ in the coils 95 and 96 that produce the vertical magnetic field is the same phase as "S." If the sampling voltage "S" is applied directly to the vertical coils 95 and 96, the vector relationships between the coil or field currents $H_1$, $V_1$ and the sampling voltage "S" are as illustrated in Figure 5. The vectors $V_1$ and $H_1$ are interchanged in position and accordingly the direction of rotation of the magnetic field is reversed. When the sampling wave S is applied directly to the horizontal field coils 88 and 89 the diagram of Figure 5 shows that the resultant magnetic field is vertical as only the vector $V_1$ has any projection on the horizontal or real axis; the vector $H_1$ is imaginary and has no real component. When the sampling wave "S" is applied directly to the vertical coils 95 and 96, the vector diagram of Figure 6 shows that the current in the horizontal coils 85 and 86 is a maximum and that the current in the vertical coils 95 and 96 is zero. In the case of Figure 5 then there is a vertical field and in the case of Figure 6 is a horizontal field. Hence changing the direct application of the sampling or beam rotation voltage from one set of coils to the other changes the position of the resultant magnetic field by 90°. Because the color phosphor struck by the beam depends on the position of the resultant magnetic field established by the coils 88, 89 and 95, 96, the shift in phase of the resultant field produces an undesired change in the color produced by the tube. In accordance with this invention, the phase shifter 73 compensates for the phase shift so that the resultant magnetic field has the same position regardless of the switching tube that is conductive.

Figure 6 illustrates another way in which the yoke 60 may be constructed. The horizontal field coils 88, 89 and the vertical field coils 95, 96 are separately connected in series and each is tuned by a separate variable condenser.

What is claimed is:

1. Apparatus adapted to establish a rotating magnetic field comprising in combination an input terminal to which a desired alternating voltage may be applied, a first pair of coils having one end coupled to said input terminal, and the other end grounded, a condenser in parallel with said first pair of coils, a second pair of coils having one end grounded, a condenser in parallel with said second pair of coils, said condensers having such capacitance that the parallel circuits formed by them and the coils are resonant at substantially the frequency of the alternating voltage applied to the input terminal, a phase shifter coupled between said input terminal and the ungrounded end of said second pair of coils, said coils being critically coupled together.

2. Apparatus adapted to establish a rotating magnetic field comprising in combination an input terminal to which a desired alternating voltage may be applied, a first pair of coils having one end coupled to said input terminal, and other end grounded, a condenser in parallel with said first pair of coils, a second pair of coils having one end grounded, a condenser in parallel with said second pair of coils, said condensers having such capacitance that the parallel circuits formed by them and the coils are resonant at substantially the frequency of the alternating voltage applied to the input terminal, a phase shifter coupled between said input terminal and the ungrounded end of said second pair of coils, a condenser coupled between the ungrounded ends of said first and second pairs of coils so as to critically couple them together.

3. Apparatus for reproducing images in color comprising in combination a cathode ray tube, an electron gun mounted in said tube, a first pair of field coils adapted to establish a magnetic field in a given plane, a second pair of field coils adapted to establish an intersection magnetic field in said plane, means for supplying said each pair field coils with differently phased alternating currents of like frequency so as to establish a rotating magnetic field so as to bend said electrons away from a normal path along a radius determined by the direction of said rotating magnetic field, means for bending said electrons back toward said normal path, a target mounted so as to intercept said beam of electrons at a point where said beam intersects said normal path, said target being adapted to emit light of a different primary color depending on the direction of approach of said beam with respect to its normal path, and switching means adapted to interchange the phases of the alternating currents applied to said pairs of field coils.

PETER H. WERENFELS.
JAMES E. ECKERT.

References Cited in the file of this patent

UNITED STATES PATENTS

| Number | Name | Date |
|---|---|---|
| 2,052,338 | Budenbom | Aug. 25, 1936 |
| 2,454,378 | Forgue | Nov. 23, 1948 |
| 2,522,055 | O'Brien | Sept. 12, 1950 |